Figure 4:
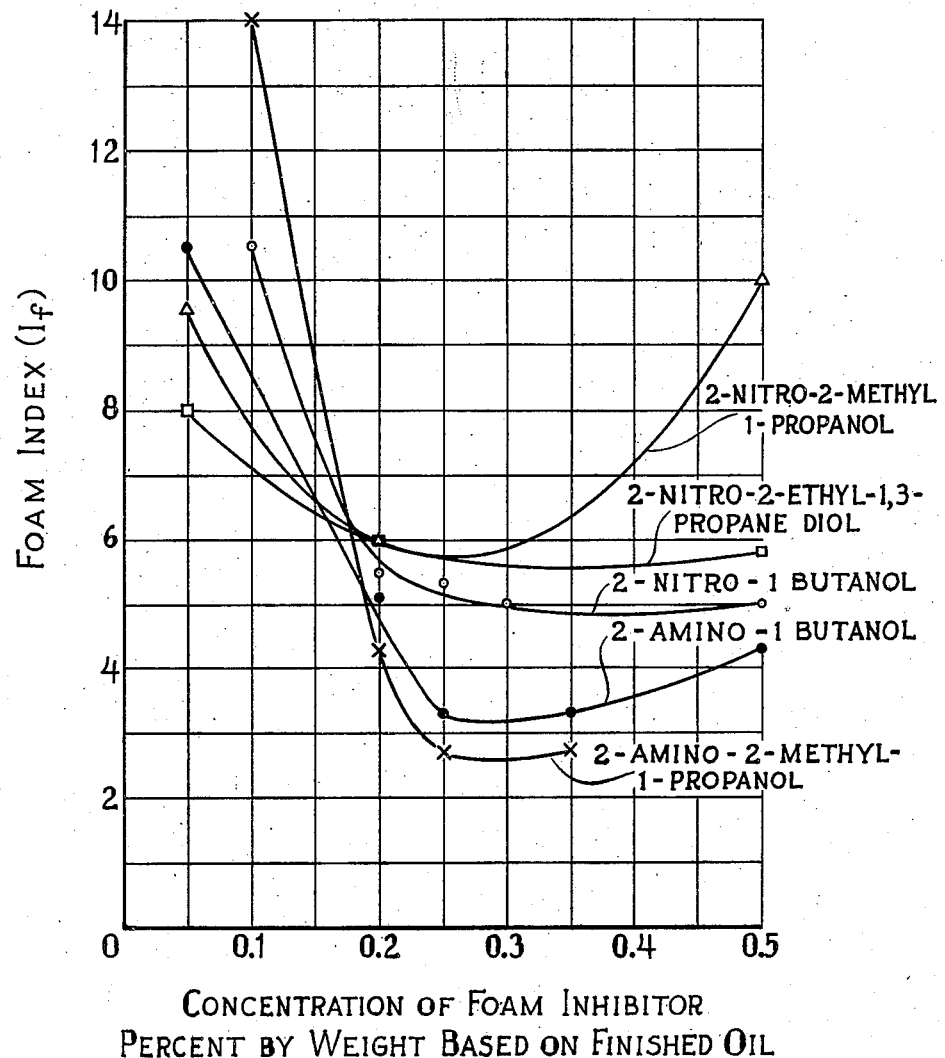

June 18, 1946. A. H. BATCHELDER ET AL 2,402,487
FOAM INHIBITED OIL
Filed Dec. 18, 1943  2 Sheets-Sheet 1
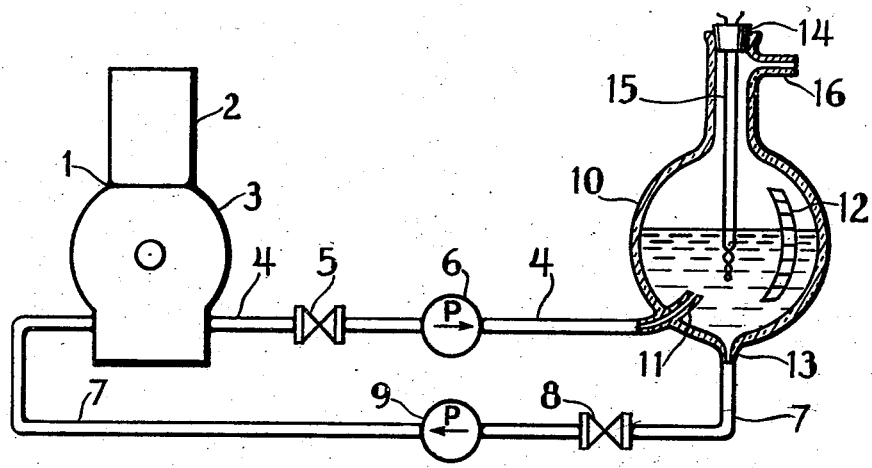
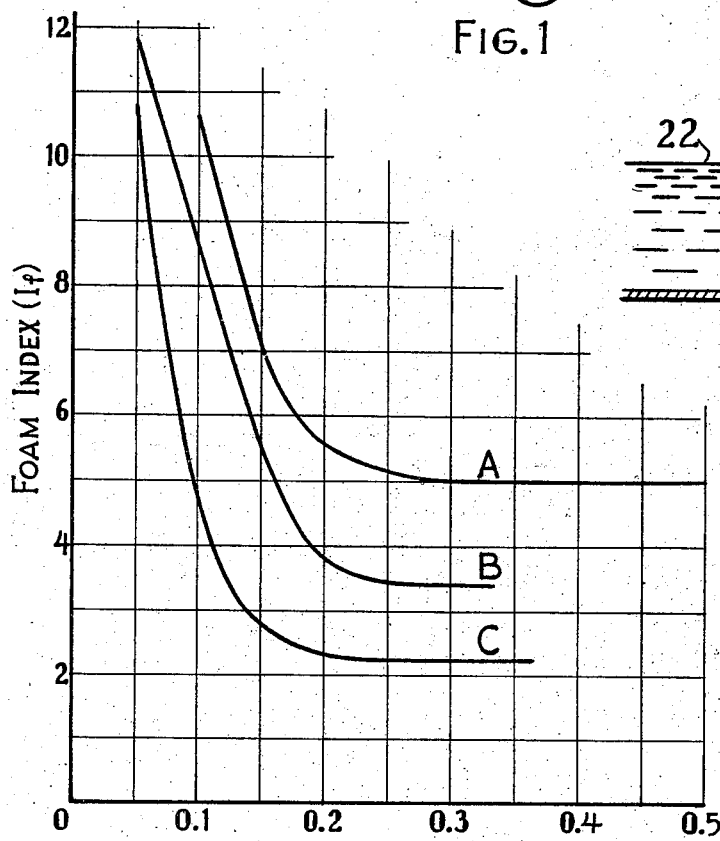
CONCENTRATION OF 2-NITRO-1-BUTANOL
PERCENT BY WEIGHT
BASED ON FINISHED OIL
FIG. 3
INVENTORS
AUGUSTUS H. BATCHELDER
FITZHUGH S. ROLLINS, JR.
BY J. Adams
ATTORNEY Patented June 18, 1946

2,402,487

UNITED STATES PATENT OFFICE 2,402,487

FOAM INHIBITED OIL

Augustus H. Batchelder and Fitzhugh S. Rollins, Jr., Berkeley, Calif., assignors, by mesne assignments, to California Research Corporation, San Francisco, Calif., a corporation of Delaware Application December 18, 1943, Serial No. 514,782

9 Claims. (Cl. 252—51)

This invention relates to the inhibition of foaming in hydrocarbon lubricating oils.

On mixing oil with air, a certain amount of foam may be created. The amount of foam and its persistence will depend upon a number of factors, such as the nature of the base oil, the nature and amount of compounding agents present in the oil, the temperatures and pressures to which the oil is subjected, and the nature of the lubricating system that supplies lubricant to the relatively moving surfaces.

Under most conditions of use uncompounded base oils and even many compounded oils will not produce troublesome foaming; either the degree of foaming is small or the foam is unstable and breaks down readily, or both conditions obtain.

There are, however, certain combinations of circumstances that have brought to the fore the problem of foaming and it is an object much sought in the art to inhibit foaming of mineral oil lubricants. Among these combinations of circumstances is the use of mineral oils compounded with metal salts of organic and/or organo-substituted inorganic acids to lubricate aircraft engines. These compounding agents, which are highly desirable as stabilizing and scavenging components of the better grades of aircraft lubricants, frequently increase the tendency of lubricants to foam. Moreover, aircraft engines are nowadays more frequently called upon to operate at high altitudes, where the atmospheric pressure is low; for example, at elevations as high as 45,000 feet above sea level, where the normal pressure corresponds to a 25 inch (mercury) vacuum (5 inch absolute pressure) at sea level. Such low pressures aggravate foaming greatly, especially in the presence of water, which vaporizes quickly at the reduced pressure and produces excessive foam. An added factor causing excessive foaming of aircraft lubricants is the type of lubrication system employed. In this system, oil from the moving parts of the motor is collected in the crankcase and pumped from there to an external tank or sump by a scavenging pump. Oil from this sump is pumped back to the motor in the usual manner by an oil pump. The foaming difficulty arises from the fact that the scavenging pump operates at excess capacity; it pumps faster than required to pump all of the available oil in the crankcase. It therefore pumps a large amount of crankcase gases along with the oil, and this at a rapid rate, and the result is entrainment of the gas in the oil and the formation of foam.

A disadvantage of excessive foaming of lubricating oils is that the oil pumped to the bearings is aerated and, as a result, insufficient lubricant may be supplied to the bearings under some conditions of operation. Another disadvantage results from the loss of oil from the crankcase and oil sump caused by foaming. Not only does this represent a costly loss of oil but it creates a fire hazard.

It is an object achieved by the present invention to inhibit the foaming of oils.

It is a particular object achieved by the present invention to inhibit the foaming of hydrocarbon lubricating oils which are compounded with metal salts of organic and/or organosubstituted inorganic acids.

It is a further particular object achieved by the present invention to inhibit the foaming of aircraft lubricants and other lubricants brought on by a combination of circumstances such as the presence in the oil of foam-inducing compounding agents, use of the oil at low pressures, and circulation of oil under conditions that produce violent intermixture of air or other gases with the oil.

These and other objects will be apparent from the description of the invention and the appended claims.

We have found that the nitro-substituted aliphatic alcohols and primary amino substituted aliphatic alcohols having at least one hydroxyl group per four carbon atoms (an OH/C molecular ratio at least 1:4) are exceedingly effective foam inhibitors for oils, especially for compounded hydrocarbon lubricating oils used under extreme foam-producing conditions.

Both a nitro and a primary amino group may be present in the molecule, and the alcohol may be a monohydric or a polyhydric alcohol.

Examples of foam inhibitors of the present invention are as follows:

1-nitro-2-butanol
1-nitro-3-butanol
1-nitro-4-butanol
2-nitro-1-butanol
2-nitro-3-butanol
2-nitro-4-butanol
1-nitro-2-propanol
2-nitro-1-propanol
2-nitro-2-ethyl-1,3-propanediol
2-nitro-2-methyl-1-propanol
Ethanolamine 1-amino-2-butanol
1-amino-3-butanol
1-amino-4-butanol
2-amino-1-butanol
2-amino-3-butanol
2-amino-4-butanol
1-amino-2-propanol
2-amino-1-propanol
2-amino-2-ethyl-1,3-propanediol
2-amino-2-methyl-1-propanol The nitro alcohols, such as 2-nitro-1-butanol, are preferred to the amino alcohols; besides being potent foam inhibitors, they are also more effective in reducing the emulsification of water with oil and they are substantially non-corrosive to copper-lead and cadmium-silver alloy bearings.

Nitro and amino alcohols containing as many as eight carbon atoms or more may be used as foam inhibitors.

Reference is made below to results obtained under the conditions of certain foaming tests, these tests being designated as the "Wisconsin test" and the "Cadillac test." These tests are carried out as follows:

*Wisconsin test.*—The equipment used in this test is illustrated diagrammatically in Figures 1 and 2 of the drawings.

Referring to Figure 1, engine 1 is a 1½ H. P. Wiscon single cylinder air-cooled gasoline engine comprising cylinder 2 and crankcase 3. Crankcase 3 is provided with outlet line 4 (which is provided with valve 5 and gear pump 6) and with inlet line 7 (which is provided with valve 8 and gear pump 9). Line 4 communicates with flask 10 through tube 11 which passes through and is sealed to the wall of flask 10 near the bottom. Flask 10, which is a round bottom flask of 5 liter capacity, is provided with an outlet tube 13 at the bottom, which communicates with the aforesaid line 7. Flask 10 is also provided with stopper 14 and a temperature measuring device 15, which passes through the stopper and into the oil in the flask; device 15 is conveniently a thermocouple. Flask 10 is also provided with an outlet tube 16 in its neck, said tube connecting with a vacuum pump, a pressure measuring device and a suitable control valve, none of which is shown in the drawing.

Referring to Figure 2, this figure shows, in diagrammatic cross-section, a portion of engine 1 on the outlet side of the crankcase, and it shows outlet tube 21, which has a slanted opening at the top such that part of the opening projects above oil level 22 and part below said oil level. In this manner, by applying suction to outlet tube 21 through line 4, both oil and crankcase gases are pumped from crankcase 3. Oil level 22 may be controlled by pumps 6 and 9 and valves 5 and 8.

In operation, engine 1 is run at a cylinder temperature of 450° F.±50° F. Oil is pumped from crankcase 3 by means of gear pump 6 and by proper adjustment of valve 5 at a rate such that 50–60% of the total volume of pumped fluid consists of gases and the remaining 50–40% consists of oil. This mixture of gases and oil is passed through line 4 and inlet tube 11 into flask 10. By appropriate adjustment of valve 8 and gear pump 9, the oil level in flask 10 is maintained at the halfway mark on the flask, as shown by scale 12. The system is also operated so that the oil temperature in flask 10 is 135–140° F. and so that the jet of oil and gas mixture entering flask 10 through inlet tube 11 produces a fountain above the level of the oil in the flask which is 1 to 1½ inches high. A vacuum is pulled on outlet tube 16 so as to maintain a suitable reduced pressure in flask 10.

The "foam index" of an oil is calculated as follows: An absolute pressure of 5 inches of mercury is maintained in flask 10. The height of foam above the oil level is measured on scale 12 at this pressure. Then the pressure is decreased until the line of distinction between the oil and the foam just becomes indistinguishable. The foam index, $I_f$, is given by the equation $$I_f = \frac{h}{P-p} \times 100$$

where $h$ is the foam height in inches at 5" absolute pressure, $P$ is normal atmospheric pressure in inches of mercury (29.9") and $p$ is the recorded absolute pressure in inches of mercury at which the line of demarcation between oil and foam just becomes indistinguishable. $I_f$, therefore, reflects both the foaminess of an oil at a given low pressure (5" of mercury) and the extent to which pressure can be reduced before foaming becomes complete. It provides a reliable index of the foaming characteristics of an oil, especially in an aircraft lubricating system where oil is pumped from the crankcase to an external sump and back again to the crankcase and where the engine is operated at high altitudes.

*Cadillac test.*—In this test a 1938 Cadillac passenger car engine equipped with an external oil sump is used. The oil circulating system is modified by substituting for the regular engine suction line a special intake line leading from the sump to the crankcase. A scavenging line provided with a gear pump is connected with the bottom of the crankcase and with the sump. In operation oil is pumped from the crankcase through the scavenging line by the gear pump, which is operated at about 200% of the capacity needed to keep the crankcase empty; by this means a large amount of crankcase gases is pumped with the oil to the sump and is churned into the oil. Additional turbulence is provided in the sump, by directing the oil stream toward both side walls of the sump. Foaming, as measured by foam height, is measured in the sump, which is provided with means to see into and measure the height of foam in the sump. Oil is returned to the crankcase through the special intake line. The foam height is measured at 160° F. and at 210° F. oil temperature in the sump.

The following tables of data will serve to illustrate the practice and advantages of the present invention:

Table I

| Oil | Foam inhibitor | Wisconsin test $I_f$ | Cadillac test, foam height in inches at— | |
|---|---|---|---|---|
| | | | 160° F. | 210° F. |
| Oil A | Nil | 35 | 8+ | 8+ |
| Do | 0.05% 2-nitro-1-butanol | 10.9 | | |
| Do | 0.10% 2-nitro-1-butanol | 2.9 | | |
| Do | 0.15% 2-nitro-1-butanol | 3.3 | 0.3 | 0.0 |
| Do | 0.25% 2-nitro-1-butanol | 2.2 | | |
| Do | 0.20% 2-nitro-2-ethyl-1,3-propanediol | 6.0 | | |
| Do | 0.20% 2-nitro-2-methyl-1-propanol | 6.0 | | |
| Do | 0.25% 1-nitro-2-propanol | 8.5 | | |
| Do | 0.05% 2-amino-2-methyl-1-propanol | 14.0 | | |
| Do | 0.25% 2-amino-2-methyl-1-propanol | 2.7 | | |
| Do | 0.20% 2-amino-2-ethyl-1,3-propanediol | 10.0 | | |
| Do | 0.05% 2-amino-1-butanol | 10.5 | | |
| Do | 0.25% 2-amino-1-butanol | 3.3 | | |
| Oil B | Nil | 21.5 | | |
| Do | 0.15% 2-nitro-1-butanol | 8.3 | | |
| Oil C | Nil | 8.3 | 8+ | 8+ |
| Do | 0.25% 2-nitro-1-butanol | 3.3 | 2.3 | 1.0 |

The oils referred to in the above table as oils A, B and C were as follows: Oil A was a solvent treated SAE 30 California oil having a viscosity index of 55 and containing about 1.5% of a mixture of a calcium phenate, a calcium salt of a partial ester of a thio acid of phosphorus and a higher alkyl sulfide. Oil B was an SAE 30 Mid-Continent oil having a viscosity index of 55 and containing about 2 per cent of a mixture of the same phenate, phosphate and sulfide as in oil A. Oil C was an SAE 30 Pennsylvania type oil having a viscosity index of 100 and containing about 0.75% of the barium salt of an alkyl phenol disulfide and about 0.15% of octadecyl alcohol. All percentages are by weight based on the finished oil.

The foam inhibitors of the present invention may be incorporated in oils in various ways. For example, in the case of oils compounded with other agents besides the foam inhibitor, the foam inhibitor may be added to the base oil before the addition of other compounding material, or it may be added to the compounded oil. In preparing oils compounded with detergents, oxidation inhibitors, extreme pressure agents and the like, it is a common practice to produce a concentrated solution or dispersion of these compounding agents in a mineral oil, which is subsequently blended with base oil to produce the finished oil. We have found that the foam inhibitors of the present invention are advantageously incorporated in compounded lubricating oils by first including the foam inhibitor in a concentrate of the compounding agents and adding the thus modified concentrate to the base oil. Another way in which the foam inhibitors of the present invention may be added to oils is to add the foam inhibitor directly to the oil in an engine; for example, by adding it to the engine sump.

The foam inhibitors of the present invention, especially the nitro-alcohols, are preferably dried before they are incorporated in a mineral oil concentrate or in the base oil or finished oil. This may be accomplished, in the case of a liquid foam inhibitor, by keeping it in contact with anhydrous sodium sulfate or other suitable dehydrating agent overnight and then filtering it. A solid foam inhibitor may be dissolved in a suitable solvent, the solution dried in like manner and filtered and the solvent removed by distillation.

Figures 3 and 4 of the accompanying drawings further illustrate the foam inhibiting effects of the inhibitors of the present invention.

In both Figure 3 and Figure 4, abscissae represent concentrations of foam inhibitor by weight based on finished oil and ordinates represent foam index ($I_f$). All data were obtained in the Wisconsin test. The oil tested was the same as oil A of Table I.

In Figure 3, curve A represents oil to which undried foam inhibitor (2-nitro-1-butanol) was added directly to the finished oil; that is, 2-nitro-1-butanol as received from the supplier and without preliminary drying was added to the oil compounded with phenate, thiophosphate and sulfide in the proportions indicated. Curve B represents oil prepared as follows: A concentrated solution in mineral oil of the phenate, thiophosphate, sulfide and 2-nitro-1-butanol was prepared and this concentrate was blended with more oil to produce the finished oil. Curve C represents an oil similarly prepared except that the 2-nitro-1-butanol was dried before it was added to the concentrate.

It is evident from curves A, B and C of Figure 3 that it is advantageous to add the foam inhibitor to a concentrate and then add the concentrate to the oil, and it is also evident that it is advantageous to dry the foam inhibitor before adding it to the oil.

Figure 4 shows graphically the foam inhibiting effects of various inhibitors of the invention and, as will be apparent from the curves, the optimum concentration of inhibitor is about 0.2 to 0.4%, varying somewhat with the inhibitor.

Among the foam inhibitors of the present invention, the nitro alcohols are notable for their demulsifying properties. This is especially important in certain types of service, such submarine and other kinds of marine service, where water leakage into the oil sump occurs. The demulsifying properties of the nitro alcohols are exemplified by the data in Table II. These data are taken from the results of an emulsification test in which equal volumes of the oil under test and water are vigorously agitated together to produce an emulsion and the resulting emulsion is then centrifuged to separate the mixture into an oil phase, a water phase and an emulsion phase, which is called "cuff." The cuff is a creamy emulsion which lies between the bottom water phase and the top oil phase. The data in Table II refer to tests all of which were carried out in exactly the same manner except for variation of the base oil and additive components of the oil.

Table II

|  | Per cent by volume of— | | |
|---|---|---|---|
|  | Cuff | Water | Oil |
| Oil A | 15 | 35 | 50 |
| Oil A+0.15% 2-nitro-1-butanol | 1 | 49 | 50 |
| Oil C | 45 | 8 | 47 |
| Oil C+0.25% 2-nitro-1-butanol | 2 | 50 | 48 |

Oils A and C were the same as oils A and C, respectively, of Table I.

It will be noted that in each case the volume of oil at the conclusion of the test constituted 50% or nearly 50% of the total volume; that is, in any case very little oil became emulsified in water. However, attention is directed to the fact that in actual practice, although very little oil may be emulsified in water, a great deal of oil-in-water emulsion may be formed; in fact, a great deal of oil-in-water emulsion is formed in certain types of service. This emulsion would remain mechanically dispersed throughout the oil where it is undesirable because it impairs lubrication and may cause early engine failure.

The foam inhibitors of the present invention may be used in oils in the amount of 0.001 per cent or lower to 1 per cent or higher by weight based on the finished oil, but percentages of about 0.01 to 0.5 are preferred. Where the foam inhibitors are used in oils compounded with chemical additives that produce foaming, the foam inhibitors may be used in the amount of 0.1 to 100 per cent by weight based on the said chemical additives, preferably about 1 to 50 per cent based on the said chemical additives.

Concentrated dispersions in mineral oil of the foam inhibitors may be prepared for later blending with base oil to produce finished oil. As stated, the foam inhibitors are advantageously added to concentrates of other compounding agents. Besides the observed effect of increased foam inhibiting capacity so obtained, this procedure has the advantage that a small weight of concentrate can be prepared at one time and place and blended with base oil at its source or place of use and at a later time to produce a finished oil having the required properties, including reduced foaming tendency. Such concentrates may contain, for example, 0.5 to 50 per cent by weight of foam inhibitor, based on total concentrate.

The foam inhibitors of the present invention may be used in compounded or uncompounded oils; they may be used for inhibiting foaming not only in the lubricating systems of internal combustion engines but also in gear mechanisms and turbines; and they may be used in naphthenic, paraffinic, mixed base, polymer, and synthetic hydrocarbon oils and in other types of oil.

The principal field of application of the foam inhibitors of the present invention is in compounded petroleum lubricating oils used in the lubrication of internal combustion engines, especially in aircraft engines and in military tank engines, both gasoline and Diesel types. Among the types of compounding agents which, under certain conditions, enhance foaming and with which the foam inhibitors of the present invention may be advantageously combined in oils, may be mentioned the following: metal alkyl phenates, such as the calcium, barium and zinc salts of the condensation product resulting from reacting phenol with a butene polymer in the presence of sulfuric acid, said butene polymer averaging 16 carbon atoms per molecule; also calcium, barium, and zinc lauryl and eicosyl phenates; metal organo phosphates, such as calcium, barium and zinc cetyl phosphates, calcium, barium and zinc cetyl thiophosphates, and calcium, barium and zinc methylcyclohexyl thiophosphates and calcium, barium and zinc cetylphenyl thiophosphates; metal organo sulfonates such as calcium, barium and zinc petroleum sulfonates and calcium, barium and zinc cetylphenyl sulfonates; calcium, barium and zinc naphthenates; and calcium, barium and zinc salts of the dithiocarbamates produced by reacting reduced petroleum nitrogen bases (alkyl piperidines) with $CS_2$ in the presence of KOH and producing the calcium, barium and zinc dithiocarbamates by double decomposition of the potassium dithiocarbamate with aqueous $CaCl_2$, $BaCl_2$ or $ZnCl_2$. Thus each of the foam inhibitors specifically mentioned hereinabove may be used in lubricating oil in combination with each of the above mentioned metal salts and with combinations of the said metal salts. Examples of such combinations are as follows:

| Metal salt compounding agents | Foam inhibitors |
|---|---|
| (1) Calcium cetyl phenate [1] | +2-nitro-1-butanol. |
| Do | +1-nitro-2-propanol. |
| Do | +Ethanolamine. |
| Do | +2-amino-1-butanol. |
| (2) Calcium cetyl phosphate | +2-nitro-1-butanol. |
| Do | +1-nitro-2-propanol. |
| Do | +Ethanolamine. |
| Do | +2-amino-1-butanol. |
| (3) Calcium cetyl thiophosphate | +2-nitro-1-butanol. |
| Do | +1-nitro-2-propanol. |
| Do | +Ethanolamine. |
| Do | +2-amino-1-butanol. |
| (4) Calcium cetylphenyl thiophosphate | +2-nitro-1-butanol. |
| Do | +1-nitro-2-propanol. |
| (5) Calcium petroleum sulfonate | +2-nitro-1-butanol. |
| Do | +1-nitro-2-propanol. |
| Do | +Ethanolamine. |
| Do | +2-amino-1-butanol. |
| Salt No. (1)+salt No. (2) | +2-nitro-1-butanol. |
| Do | +2-amino-1-butanol. |
| Salt No. (1)+salt No. (3) | +2-nitro-1-butanol. |
| Do | +2-amino-1-butanol. |
| Salt No. (1)+salt No. (4) | +2-nitro-1-butanol. |
| Do | +2-amino-1-butanol. |
| Salt No. (5)+zinc di-(methylcyclohexyl) thiophosphate. | +2-nitro-1-butanol. |
| Do | +2-amino-1-butanol. |

[1] By calcium cetyl phenate is meant the calcium salt of the alkylated phenol produced by condensing phenol with a butene polymer in the presence of concentrated sulfuric acid, the butene polymer averaging 16 carbon atoms per molecule.

For the purpose of defining the foaming characteristics of an oil; of indicating whether the oil is one which causes troublesome foaming under certain conditions of use, either a test such as the above described Wisconsin and Cadillac tests, or a test in an aircraft engine provided with an external sump and flying at a high altitude, may be used. An "excessively foaming" oil may be defined as one which gives a foam index, $I_f$, using a 5" absolute pressure to obtain the numerator of the ratio $$\frac{h}{P-p}$$

of 15 or above. Or an "excessively foaming" oil may be defined as an oil which, when used as the crankcase lubricant of an aircraft engine provided with an external sump through which the crankcase lubricant is passed and flying at an elevation greater than 30,000 feet above sea level, will foam sufficiently to cause substantial loss of oil through the breather caps.

We claim:
1. A method of producing foam inhibited lubricants, comprising incorporating a short chain nitro aliphatic alcohol containing at least one hydroxyl group for each four carbon atoms into a mineral oil of lubricating viscosity to produce a concentrated dispersion of the said alcohol in mineral oil, and blending the said concentrated dispersion in mineral lubricating oil to produce a lubricating oil containing a small amount, sufficient to inhibit foaming of the oil, of said alcohol.

2. The method of claim 1, wherein said nitro aliphatic alcohol is 2-nitro-1-butanol.

3. A lubricating composition comprising a hydrocarbon lubricating oil substantially free from water, at least one salt which improves the lubricating properties of the oil but which causes an increased tendency of the oil to foam, said salt being selected from the group consisting of metal salts of organic acids of the class of sulfonic and phenolic acids and metal salts of organo-substituted inorganic acids of the class of phosphoric and thiophosphoric acids, and a small amount, sufficient substantially to inhibit foaming of the oil, of a short chain alcohol selected from the group consisting of nitro aliphatic alcohols and primary amino aliphatic alcohols, said alcohol containing at least one hydroxyl group for each four carbon atoms.

4. The lubricant of claim 3 wherein said salt is an oil-soluble polyvalent metal salt of an alkylated phenol.

5. The lubricant of claim 3 wherein said salt is an oil-soluble polyvalent metal salt of organo-substituted phosphoric acid.

6. The lubricant of claim 3 wherein said alcohol is 2-nitro-1-butanol.

7. The lubricant of claim 3 wherein said alcohol is 2-nitro-2-ethyl-1,3-propanediol.

8. The lubricant of claim 3 wherein said alcohol is 2-amino-2-methyl-1-propanol.

9. A lubricating composition comprising a concentrated dispersion in mineral oil substantially free from water of at least one salt selected from the group consisting of metal salts of organic acids of the class of sulfonic and phenolic acids and metal salts of organo-substituted inorganic acids of the class of phosphoric and thiophosphoric acids, and a short chain alcohol selected from the group consisting of nitro aliphatic alcohols and primary amino aliphatic alcohols, said alcohol containing at least one hydroxyl group for each four carbon atoms.

AUGUSTUS H. BATCHELDER.
FITZHUGH S. ROLLINS, Jr.